May 30, 1967  W. KASTEN  3,322,279

FILTER CONDITION INDICATOR DEVICE

Filed July 15, 1965

INVENTOR.
WALTER KASTEN
BY
William N. Antonis
ATTORNEY

United States Patent Office 3,322,279
Patented May 30, 1967

3,322,279
FILTER CONDITION INDICATOR DEVICE
Walter Kasten, Madison Heights, Mich., assignor to The Bendix Corporation, Madison Heights, Mich., a corporation of Delaware
Filed July 15, 1965, Ser. No. 472,134
8 Claims. (Cl. 210—90)

This invention relates to a filter condition indicator device and more particularly to an indicator device for use in a filter unit which includes a compressible filtering element therein.

Differential pressure sensing devices are widely used in industry and in the filter industry in particular. Such devices normally sense changes in pressure drop across a filter element and indicate in some manner or another the condition of the filter elemet. However, all of such known devices utilize the differential in fluid pressure upstream and downstream of the filtering element to operate a differential piston and indicator which function independently of the filtering element.

Accordingly, one of the objects of this invention is to provide an indicating device which is an integral part of the filtering element.

More specifically, it is an object of this invention to provide an indicating device in a filter unit which utilizes the compressibility of the filtering element to operate the indicator.

Another object of this invention is to provide a filter condition indicator device which not only indicates the differential pressure across the filtering element but also indicates the extent to which the filtering element has been compressed.

A further object of this invention is to provide a filter condition indicator device for use with edge-type compressible filtering elements which may be easily and inexpensively fabricated.

The above and other objects and features of the invention will become apparent from the following description of the device taken in connection with the accompanying drawing which forms a part of this disclosure and in which.

Figures 1, 2:
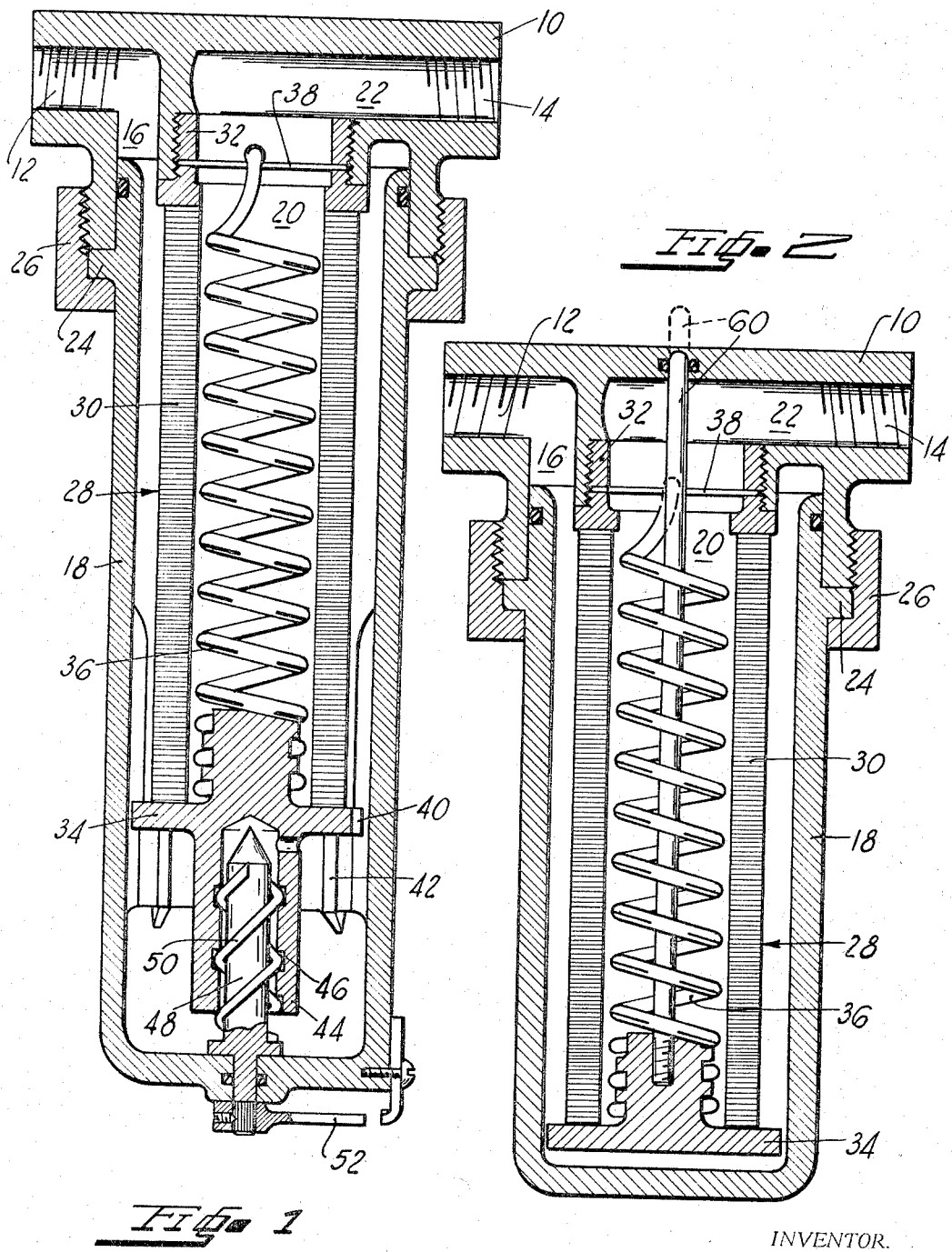
FIGURE 1 is a sectional view of a filter unit incorporating the invention.
FIGURE 2 is a sectional view, similar to FIGURE 1, of a filter unit incorporating another embodiment of the invention.

Referring to FIGURE 1, it will be seen that numeral 10 indicates a filter head having an inlet port 12 and an outlet port 14 which communicate with each other via passage 16, fluid bowl 18, and passages 20 and 22, respectively. The bowl, which has an annular flange 24 in abutment with the filter head, is attached to the head through means of a threaded coupling 26. A filtering element, indicated generally by the numeral 28, is disposed in the fluid bowl in such a manner that fluid flowing between the inlet port 12 and the outlet port 14 will flow therethrough, as indicated by the arrows. Brackets (not shown) may be provided for mounting the filter unit on an engine or other mechanism.

The filtering element 28 includes an edge-type compressible tubular filtering element 30, a ferrule 32 which is threaded to the head 10, an endplate 34, and a tension spring 36, the lower end of which is suitably connected to the endplate and the upper end of which is connected to the ferrule through means of pin 38. The edge-type compressible element 30 may be formed of a plurality of washers in registered face to face contact, as disclosed in my Patent No. 2,375,246, issued May 8, 1945, or may be formed of a plurality of axially aligned convolutions of a ribbon material, as disclosed in my Patent No. 2,421,704, issued June 3, 1947.

The endplate 34 is provided with an external spline 40 which engages a mating internal spline 42 located in the lower portion of the filter bowl 18. The purpose of these splines is to prevent the filter element endplate, which is also the spring retainer, from rotating. A hollow member 44 extends from the retainer endplate 34 and has an internal helical thread 46 formed therein. A rotatable shaft 48 extends through the bottom of the filter bowl and has a mating external thread 50 formed thereon which engages the internal helical thread 46. The portion of the rotatable shaft which is located outside of the filter bowl is serrated and is fitted with an indicator member 52.

During operation of the unit, fluid will enter the inlet port 12, flow through the filtering element 28 from the outside thereof to the inside thereof, and will leave through the outlet port 14. Because of friction losses which occur during flow of fluid through the filtering element, the internal fluid pressure of the element will be less than the external pressure. This differential in pressure will increase as the rate of flow increases and as the filter element becomes contaminated.

Since the filtering element 28 is fixed at the upper end but is free to move at the lower end, any increase in the pressure differential across the filtering element will act across each washer or convolution of the element, as well as across the endplate, and will cause the filtering element to be compressed to a shorter length. Upon the occurrence of such compression, the endplate 34 will also move upwardly, and, since it cannot rotate, will cause rotation of shaft 48 and movement of indicator member 52 to a signalling position.

The embodiment shown in FIGURE 2 operates in exactly the same manner as the embodiment of FIGURE 1, insofar as the compressibility of the filter element is concerned. However, instead of utilizing mechanism for converting axial movement of the endplate 34 to rotary movement of the indicating member 52, a vertical indicating rod 60 is suitably connected directly to the endplate and projects through the top of the filter housing. Thus, axial movement of the endplate, which occurs upon compression of the filtering element, will cause direct axial movement of the indicator rod from a nonsignalling to a signalling position.

The several practical advantages which flow from my invention are believed to be obvious from the above description, and other advantages may suggest themselves to those who are familiar with the art to which this invention relates.

Having thus described the various features of my invention, what I claim as new and desire to secure by Letters Patent is:

1. A filter unit for separating contaminants from a fluid flowing therethrough comprising a housing having inlet and outlet passage means, an edge-type compressible tubular filtering element located in said housing between said inlet and outlet passage means so that the outside thereof communicates with said inlet passage means and the inside thereof communicates with said outlet passage means, said filtering element having one end thereof abutting said housing, an endplate for closing the other end of said element, said endplate having one side thereof communicating with said inlet passage means and the other side thereof communicating with said outlet passage means so that increases in the pressure differential across said tubular filtering element will cause compression of said element from a first length to a shorter second length, and indicating means operatively connected to and responsive to movement of said endplate for indicating compression of said filtering element to said shorter second length.

2. A filter unit for separating contaminants from a fluid flowing therethrough comprising a housing having inlet and outlet passage means, a layered edge-type compressible tubular filtering element having radially extending pores formed between said layers for permitting flow of fluid therethrough from the outside of the element to the inside of the element, said filtering element having one end thereof abutting said housing, an endplate abutting the other end of said tubular filtering element, said endplate having one side thereof communicating with the fluid outside the filtering element and the other side thereof communicating with the fluid inside the filtering element so that as the fluid pressure outside the element becomes greater than the fluid pressure inside the element the increasing differential pressure thereacross will cause compression of said filtering element from a first length to a shorter second length, and indicating means operatively connected to and responsive to movement of said endplate for indicating compression of said element to said shorter second length.

3. A filter unit, as defined in claim 2, which includes spring means operatively connected to said housing and said endplate for urging said filtering element towards a shorter second length.

4. A filter unit, as defined in claim 3, wherein said indicating means includes first means operatively connected to said endplate and said housing for preventing relative rotation therebetween, a rotatable indicator member located externally of said housing, and second means operatively connected to said endplate and said indicator member for rotating said indicator member upon axial movement of said endplate.

5. A filter unit, as defined in claim 4, wherein said second means includes a rotatable shaft connected to said indicator member, said shaft having an external helical thread formed thereon, and a hollow member extending from said endplate, said hollow member having a mating internal helical thread for receiving and engaging the helical thread of said shaft.

6. A filter unit, as defined in claim 3, wherein said indicating means includes an indicating rod connected to and axially movable with said endplate, said rod being movable from a nonsignalling to a signalling position.

7. A filter unit, as defined in claim 3, wherein said edge-type compressible tubular filtering element is formed of a plurality of washers in registered face to face contact.

8. A filter unit, as defined in claim 3, wherein said edge-type compressible tubular filtering element is formed of a plurality of axially aligned convolutions of a ribbon material.

References Cited
UNITED STATES PATENTS

| | | | |
|---|---|---|---|
| 2,354,380 | 7/1944 | Kasten | 210—488 |
| 3,244,282 | 4/1966 | Rosaen | 210—91 X |

SAMIH N. ZAHARNA, *Primary Examiner.*